United States Patent [19]

Harrigan

[11] E Re. 29,191

[45] Reissued Apr. 19, 1977

[54] BASE REACH-THROUGH ACTIVE SERIES VOLTAGE REGULATOR

[75] Inventor: Thomas George Harrigan, Denville, N.J.

[73] Assignee: Bell Telephone Laboratories, Incorporated, Murray Hill, N.J.

[22] Filed: Apr. 15, 1975

[21] Appl. No.: 568,293

Related U.S. Patent Documents

Reissue of:

[64] Patent No.: 3,652,919
Issued: Mar. 28, 1972
Appl. No.: 129,349
Filed: Mar. 30, 1971

[52] U.S. Cl. ..... 321/18; 307/43; 307/75; 307/297; 321/27 R; 323/22 T; 323/38

[51] Int. Cl.[2] ..... H02M 7/217

[58] Field of Search ..... 323/4, 9, 22 T, 22 SC, 323/38; 321/11, 16–18, 27 R; 307/44, 64, 43, 75, 65, 297, 296

[56] References Cited

UNITED STATES PATENTS

| | | | |
|---|---|---|---|
| 2,701,858 | 2/1955 | Bakeman | 321/16 |
| 3,217,237 | 11/1965 | Giger | 323/22 T |
| 3,375,437 | 3/1968 | Mellott et al. | 323/22 SC |
| 3,414,802 | 12/1968 | Harrigan et al. | 321/16 |

FOREIGN PATENTS OR APPLICATIONS

| | | | |
|---|---|---|---|
| 1,275,682 | 8/1968 | Germany | 321/11 |

*Primary Examiner*—Gerald Goldberg
*Attorney, Agent, or Firm*—Joseph A. Cameron

[57] ABSTRACT

The pass transistor of this series regulator supplies current at a regulated voltage only sightly below its unregulated supply voltage. The driver transistor, driven by the feedback loop, is supplied from a higher voltage source. During periods when the pass transistor cannot supply the load because its source voltage is too low, the driver transistor supplies the load through the base-emitter junction of the pass transistor without affecting the regulation.

5 Claims, 3 Drawing Figures

BASE REACH-THROUGH ACTIVE SERIES VOLTAGE REGULATOR

Matter enclosed in heavy brackets[ ] appears in the original patent but forms no part of this reissue specification; matter printed in italics indicates the additions made by reissue.

BACKGROUND OF THE INVENTION

This invention relates to regulated DC power supplies. More particularly, it relates to what is known as the series type regulator in which regulation is achieved by the control of an impedance element between input and output. This is distinguished from the switching type regulator in which the duty cycle of a switch connected between input and output is controlled to effect regulation.

The choice between a series type or switching type DC voltage regulator is often a difficult one, particularly for an audio frequency communications system. The switching type regulator is very efficient, but it generates considerable noise within or slightly above the audio frequency range that can require filtering at an appreciable expense. The series type regulator, on the other hand, is in itself a dynamic filter that provides excellent regulation, but it is notoriously inefficient. The entire expected range of variation of input voltage must usually be absorbed within the series element. While in a laboratory power supply efficiency is not usually a very important consideration, in a large system, it can be very important. In a telephone system, for example, with thousands of circuits to be supplied with regulated voltage, efficiency must be considered with respect to heat and space limitations, as well as the cost of power consumption.

In U.S. Pat. No. 3,414,802, which issued to this inventor and W. E. Jewett on Dec. 3, 1968, a system is disclosed that solves the efficiency problem with a pair of stacked series regulators. The Harrigan-Jewett system uses two regulators with their outputs connected in parallel. The first regulator operates efficiently with a minimum voltage drop across it during the very high percentage of time when the input voltage is within a narrow nominal range. The second regulator, operating from a higher input voltage, is adjusted to supply a slightly lower output voltage than the first regulator supplies. The second regulator is therefore normally cut off and operates only when the output voltage falls because of a larger drop in the input voltage than the first regulator can absorb. The system is therefore particularly useful where more than one supply voltage is available and where the normal input voltage variation is not great. The system does not require however, two regulators each complete with output voltage sensor, error detector feedback circuit, and pass transistor.

An object of this invention is to regulate DC voltage very efficiently over a wide input voltage range using a single series type regulator.

A second object is to provide efficient DC voltage regulation at considerable savings in cost and space.

A third object is to provide the same advantages of the Harrigan-Jewett circuit with the use of a single series type voltage regulator.

SUMMARY OF THE INVENTION

In this efficient series type voltage regulator, the collector of the pass transistor is connected to a first source of direct current, and the emitter is connected to the regulated voltage output terminal. The collector-emitter path of a driver transistor is connected between a second DC source and the base of the pass transistor. Feedback means are connected between the output terminal and the driver transistor to drive the driver transistor in response to the output voltage. The difference between the voltage of the first source and the regulated output voltage is so small that the first source voltage occasionally drops below the regulated voltage. During such periods, the driven transistor supplies the current to the output terminal through the base-emitter junction of the pass transistor from the second source, the voltage of which is high enough to remain above the regulated voltage. Efficiency is improved because the voltage drop across the pass transistor is never very large, and the current through the driver transistor is large only during periods of very low first source voltage.

DETAILED DESCRIPTION

Figure 1:
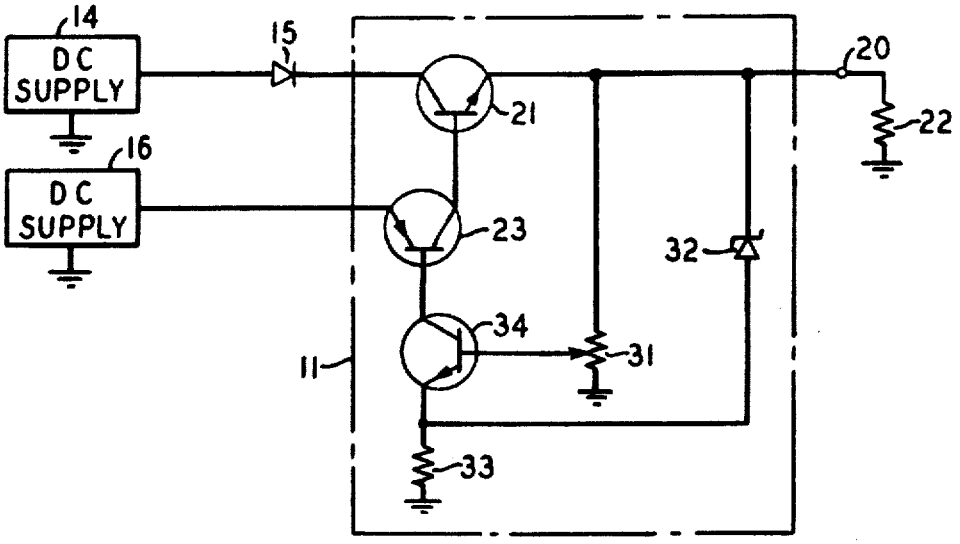
FIG. 1 is a schematic diagram of a circuit embodying the essential elements of the invention.

In the embodiment of FIG. 1, a series voltage regulator 11 is powered by two direct current supplies 14 and 16. Supply 14 is connected through a blocking diode 15 to the collector of the pass transistor 21 of regulator 11. The emitter of pass transistor 21 is connected to an output terminal 20 to which a load 22 may be connected. The collector-emitter path of a driver transistor 23 is connected between supply 16 and the base of pass transistor 21. A potentiometer 31 is connected between output terminal 20 and ground. The series combination of a zener diode 32 and a resistor 33 is also connected between output terminal 20 and ground. Finally, an error detector transistor 34 has its collector connected to the base of driver transistor 23, its emitter connected to the junction between zener diode 32 and resistor 33 and its base connected to the tap on potentiometer 31.

Except for the fact that driver transistor 23 and pass transistor 21 operate from different current supplies, the circuit of FIG. 1 operates in a manner similar to the well-known series type regulator. The zener diode 32, being biased into its breakdown range by resistor 33, maintains a relatively constant voltage across its terminals. It therefore applies directly to the emitter of error detector transistor 34 the entire variation of output voltage. The base of transistor 34 on the other hand, being connected to a potentiometer tap, sees only a portion of the variation of output voltage. The potentiometer tap acts like a source of reference potential. If the output voltage at terminal 20 tends to rise therefore, the emitter voltage of transistor 34 increases much more than its base voltage, reducing its collector current. Applied to the base of driver transistor 23, the reduced collector current reduces the drive to base transistor 21, in turn reducing the current to terminal 20, hence offsetting the original tendency of the output voltage to rise. This provides the well-known series type regulation which is efficient only when the drop across the pass transistor is small.

In order to keep the voltage drop across pass transistor 21 small for high efficiency, regulator 11 is designed as if it were handling only a nominal range of supply voltage from supply 14. That is, the regulated output voltage at terminal 20 plus the minimum drop across transistor 21 is equal to the nominal minimum output voltage of supply 14. The nominal minimum voltage may be considered the minimum voltage that occurs relatively frequently during regular power service. With the exception of the regulator of the Harrigan-Jewett patent noted before, voltage regulators designed in this manner cannot handle the larger input voltage variations that occur relatively infrequently. Sustained operation as standby battery sources during commercial power blackout, for example, would result in a drop in output voltage that defeats the purpose of the regulator. According to the principles of this invention, however, driver transistor 23 is supplied from supply 16, the voltage of which remains higher than that required at output terminal 20. When the input voltage to pass transistor 21 drops far enough that its collector-emitter junction is voltage limited and therefore cannot supply all of the current called for to maintain the output voltage at terminal 20, driver transistor 23, operating from a higher voltage source, is not so voltage limited. It then begins to supply not merely drive current, but output current as well, right through the base-emitter junction of transistor 21 to maintain the output voltage. In order to provide this "reach-through" regulation, of course, transistor 23 and the base-emitter junction of transistor 21 must each be large enough to handle the whole load current. In addition, the nominal voltage of supply 16 must be high enough that it exceeds the output voltage at all times, even during periods when the voltage of supply 14 does not. Diode 15 prevents reverse collector current in transistor 21 driven by transistor 23.

If the basic source voltage of supply 16 varies considerably, a relatively large voltage drop will be required across transistor 23 most of the time in order to insure adequate minimum voltage. This is the consideration in connection with the pass transistor that generally causes series regulators to be very inefficient. In this case, however, during the large percentage of time transistor 23 is supplying only base current to transistor 21 and hence is not wasting much power. It is only during periods of unusually low voltage at supply 14 that transistor 23 supplies the load. If the voltage of supply 16 is also low during these same periods, the power waste is low even then.

During normal operation, therefore, load current is supplied from supply 14 through transistor 21 efficiently because the voltage across transistor 21 is never very large. During periods of abnormally low voltage at supply 14, the collector of transistor 21 is backbiased, and all of the load is supplied from supply 16 through transistor 23 and the base-emitter junction of transistor 21 with no drop in output voltage.

Figure 2:
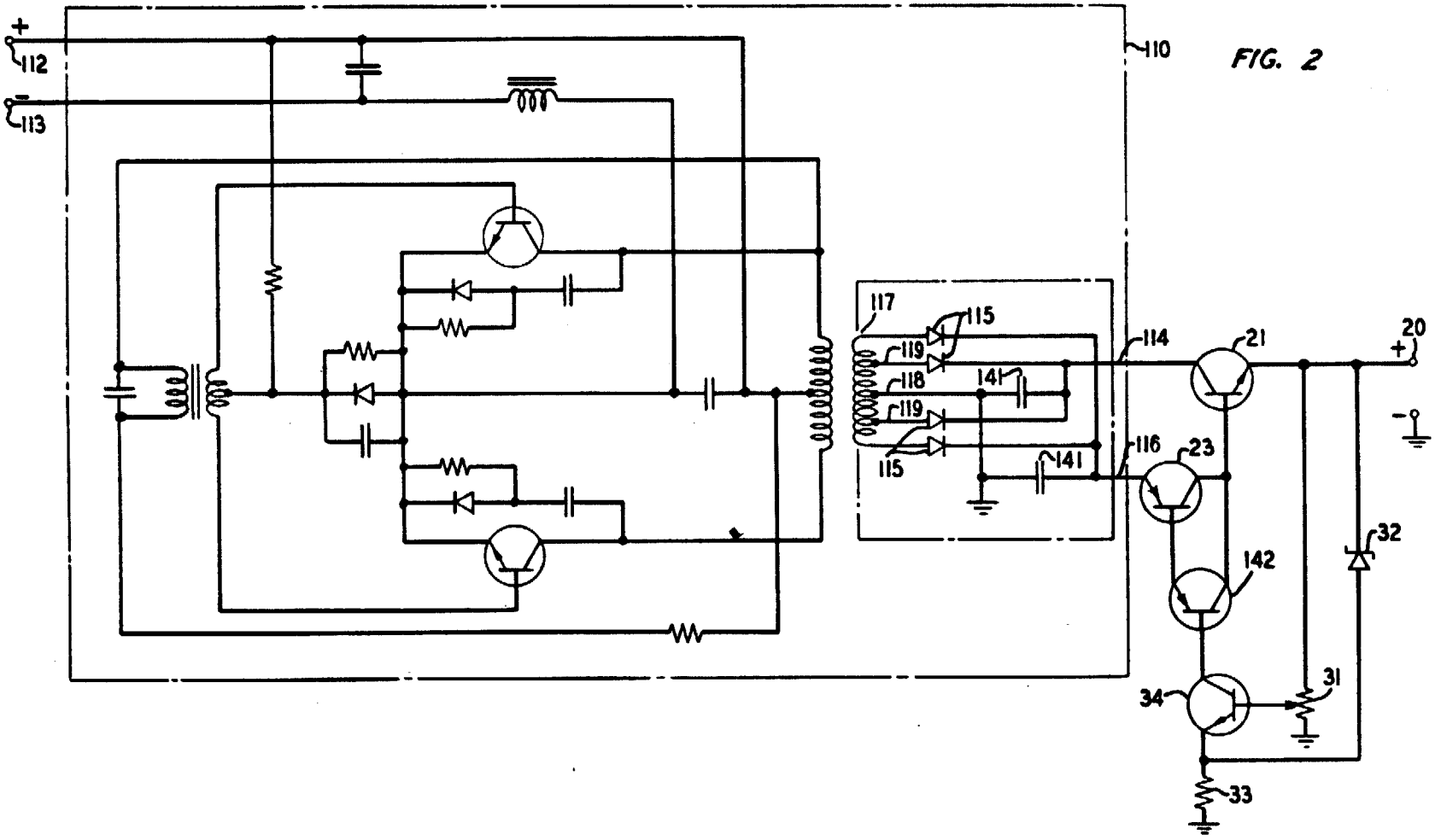
FIG. 2 is a schematic diagram of a particularly useful embodiment of the invention.

FIG. 2 shows in schematic form an embodiment of the invention that is particularly useful in supplying direct current of regulated voltage from a power system in which standby batteries are floated across the commercial power. In this figure, components and circuits have been given the same numbers as their counterparts in FIG. 1 for clarity. The two supplies in this case are both derived from one inverter 110 which has two input leads 112, and 113 for connection to the DC power source. The particular inverter shown in an improved two-core Jensen type inverter that is the subject of U.S. Pat. No. 3,448,370, which issued to the inventor of this application, June 3, 1969. Any reliable inverter may, of course, be used in its place. The secondary winding 117 of the output transformer of inverter 110 has a center tap 118, and two symmetrical taps 119—119 to provide the two supplies of FIG. 2. A set of diodes 115—115 connected to the ends of winding 117 and to each tap provide full-wave rectification for each supply, and filter capacitors 141—141 are connected across each supply to smooth the input voltages to the regulator. The outputs of these supplies therefore appear on conductors 114 and 116, respectively. Pass transistor 21 is connected between conductor 114 and output terminal 20, and driver transistor 23 is connected between conductor 116 and the base of transistor 21, as in FIG. 1.

The standby batteries floating across input leads 112 and 113 act as large filters and hence provide some voltage regulation themselves. The voltage variation on output 114 of inverter 110, therefore, is not very large as long as the commercial input power is uninterrupted. Transformer winding 117 is designed so that the minimum nominal voltage on output lead 114 with commercial power supplied is about 1 volt higher than the required regulator output voltage at terminal 20. There are enough turns in remainder of the secondary winding, however, so that even after the commercial power has been off for several hours, the voltage on lead 116 is still a few volts higher than the required output voltage. To provide enough gain in the feedback loop, an additional transistor 142 has been connected to drive transistor 23 in the well-known Darlington amplifier fashion.

The required output voltage is supplied very efficiently from this low cost equipment even during commercial power failure. If standby power is needed longer than the several hours available from the batteries, auxiliary generating equipment can be started and connected to recharge the batteries with no interruption in the regulated output voltage.

Figure 3:
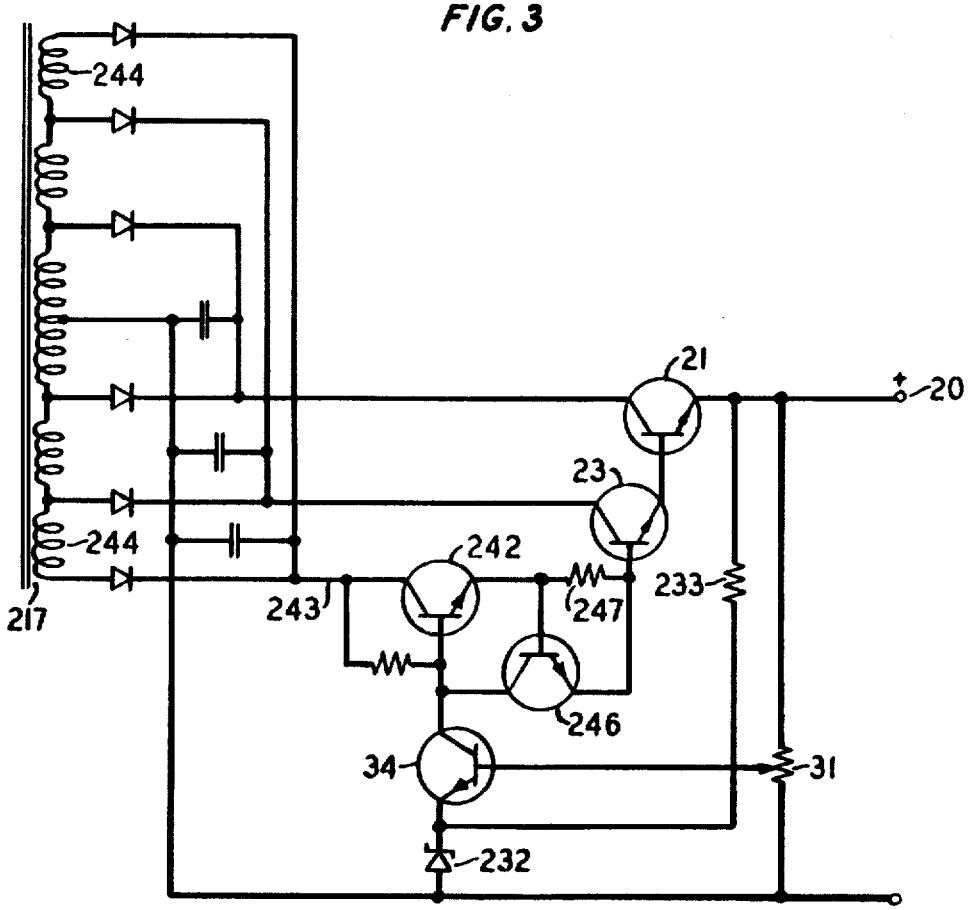
FIG. 3 is a schematic diagram of an alternative embodiment of the invention.

An alternative regulator embodying the principles of the invention and using only NPN-transistors is shown in FIG. 3. There are three areas in which this regulator differs from that of FIG. 2, all arising from the use of transistors of a single polarity. First, the feedback amplifier transistor 242 is connected in a common emitter configuration rather than a Darlington configuration. In order to provide drive to transistor 23, transistor 242 needs somewhat more reserve voltage because of its polarity. It is accordingly connected to a still higher voltage source 243 derived from additional turns 244—244 on transformer winding 217. With amplifier 242 operation from a higher voltage source however, when transistor 23 becomes voltage limited so that it cannot supply the output current through the base-emitter junction of transistor 21, transistor 242 would attempt to do so by reaching through the base-emitter junction of transistor 23 in the same manner. Transistor 246 and resistor 247 are therefore connected as a current limiter between transistors 242 and 23. As the emitter current of transistor 242 increases to increase the voltage drop across resistor 247, transistor 246 becomes more conductive to shunt the drive to transistor 242 and therefore limit the current. Finally, zener diode 232 is connected between the negative output terminal and the emitter of error detector transistor 34. The output voltage variations sensed by the tap on potentiometer 31 are applied to the base of transistor 34 to develop the error signal.

It will be obvious to those skilled in the art of voltage regulators that many variations can be made from the circuits specifically described including, for example, reversing the polarities of all of the transistors without departing from the spirit and scope of the invention.

What is claimed is:

1. A direct current voltage regulator for providing *a load current at* a regulated voltage to an output terminal comprising a first source of direct current having a voltage that may drop below said regulated voltage, a pass transistor having its collector connected to said first source and its emitter connected to said output terminal, a second source of direct current having a voltage that remains above said regulated voltage, a driver transistor having its [collector-emitter path] *collector and emitter* connected *in a low impedance path* between said second source and the base of said pass transistor, and feedback means connected between said output terminal and said driver transistor for driving said driver transistor in response to the voltage at said output terminal [whereby during periods when said first source voltage is below said regulated voltage], said driver transistor [supplies] *operating to supply said load* current *at said regulated voltage* to said output terminal through the base-emitter junction of said pass transistor [to maintain] *during periods when said first source voltage is lower than* said regulated voltage.

2. A direct current voltage regulator as in claim 1 wherein said first and second direct current sources are derived from a common alternating current source.

3. A direct current voltage regulator as in claim 1 wherein the polarity of said driver transistor is opposite to the polarity of said pass transistor.

4. A direct current voltage regulator as in claim 3 wherein said feedback means includes a source of reference potential, means for sensing the voltage at said output terminal, comparing means for producing an error signal proportional to the difference between said regulated voltage and said reference potential and amplifying means for driving said driver transistor in proportion to said error signal.

5. A direct current voltage regulator as in claim 2 including a third DC source derived from said common AC source connected to said feedback means for providing the energy to drive said driver transistor, and current limiting means connected between said feedback means and said driver transistor whereby said feedback means are prevented from supplying current to said output terminal through the base-emitter junction of said driver transistor.

* * * * *

UNITED STATES PATENT AND TRADEMARK OFFICE

CERTIFICATE OF CORRECTION

PATENT NO. : Re. 29,191

DATED : April 19, 1977

INVENTOR(S) : Thomas G. Harrigan

It is certified that error appears in the above-identified patent and that said Letters Patent are hereby corrected as shown below:

In the Abstract, line 2, "sightly" should read --slightly--. Column 3, line 19, "as" should read --on--.

Signed and Sealed this

*Twenty-seventh* Day of *December 1977*

[SEAL]

*Attest:*

RUTH C. MASON
*Attesting Officer*

LUTRELLE F. PARKER
*Acting Commissioner of Patents and Trademarks*